Aug. 5, 1969  R. B. LOVE  3,459,139
RAILWAY CAR AND TRACK ROLL STABILIZER
Filed March 23, 1967  3 Sheets-Sheet 1

Inventor
Robert B. Love
By Walter L. Schlegel, Jr.
Russell W. Pyle  Attys.

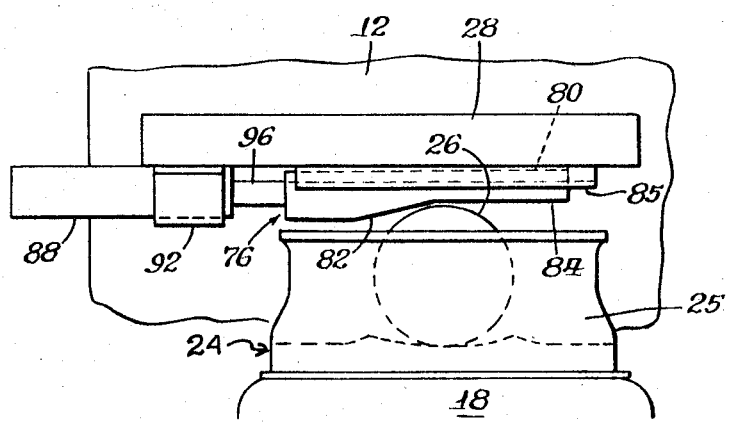
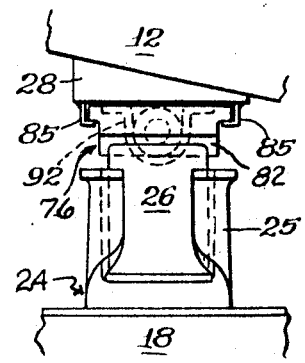
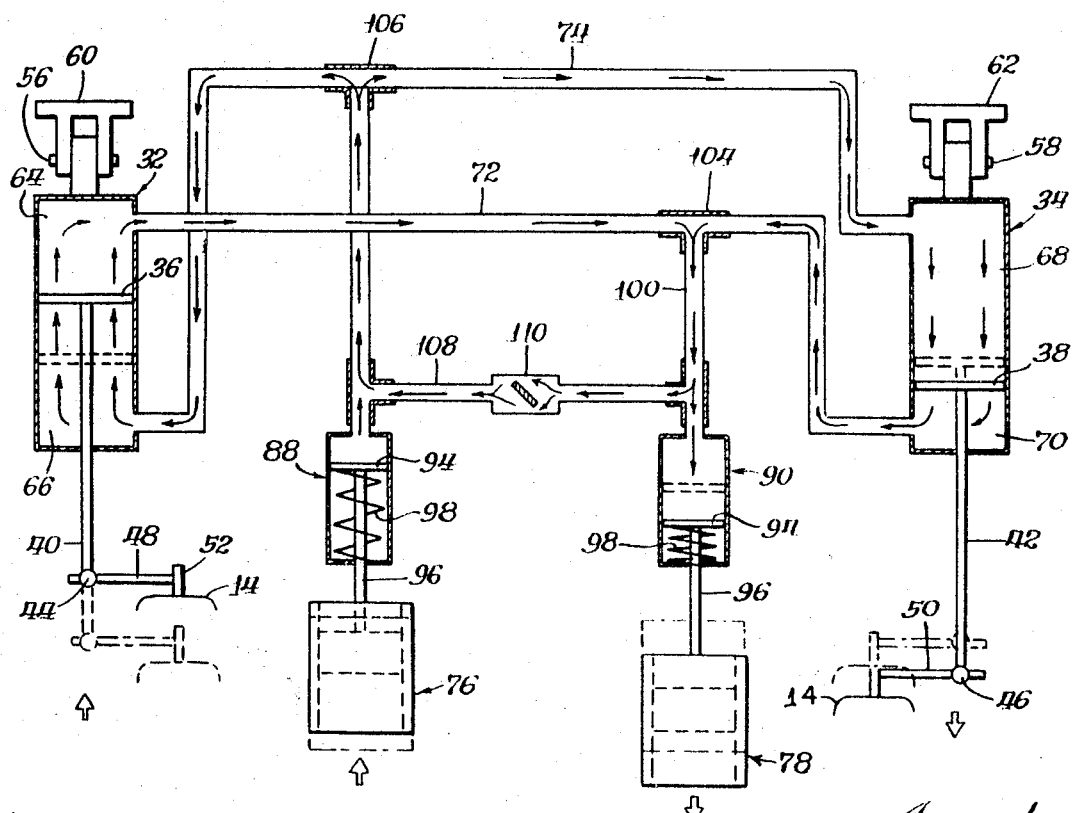

Aug. 5, 1969  R. B. LOVE  3,459,139
RAILWAY CAR AND TRACK ROLL STABILIZER
Filed March 23, 1967  3 Sheets-Sheet 3

Inventor
Robert B. Love

United States Patent Office 3,459,139
Patented Aug. 5, 1969

3,459,139
RAILWAY CAR AND TRUCK ROLL STABILIZER
Robert B. Love, Park Forest, Ill., assignor to Amsted Industries Incorporated, Chicago, Ill., a corporation of New Jersey
Filed Mar. 23, 1967, Ser. No. 625,458
Int. Cl. B61f 5/02, 5/14; F16c 17/00
U.S. Cl. 105—199                  10 Claims

ABSTRACT OF THE DISCLOSURE

In a railway vehicle having a car body supported on at least two car trucks including spaced side frames and side bearings, a push-pull type cylinder is connected on both sides of the vehicle between each side frame and the car body. The push-pull cylinders are responsive to lateral rocking of the car body relative to the car truck, and are hydraulically connected to other hydraulic cylinders that actuate wedges between the side bearings of the vehicle. The hydraulic lines are so arranged that relative rocking motions at one side of the vehicle will cause a wedge to be moved between the side bearings on the other side of the vehicle, thereby inhibiting rocking of the car body.

---

This invention relates to improvements in stabilizing devices for railway vehicles and more particularly to a hydraulic device that inhibits lateral rocking or rolling of the car body relative to the car truck in such vehicles.

During normal operation of a railway vehicle, vertical irregularities in the track may cause the car body to rock from side to side relative to the car truck at a certain frequency. As this frequency approaches the natural frequency of the railway vehicle, a condition of resonance may occur, thereby greatly amplifying the degree of roll. In order to minimize this effect, a countervailing force is required between the car body and the car truck.

Accordingly, an object of this invention is to provide a device which will minimize railway car body roll caused by rail irregularities without interfering with other motions of the vehicle in operation.

Another object of this invention is to provide sensing means between the car body and the car truck responsive to relative rocking motions therebetween.

A further object of this invention is the provision of wedges between the side bearings of a railway vehicle actuated by power cylinders responsive to the sensing means mentioned above, which in combination tend to minimize rocking of the car body relative to the car truck.

The above and other objects will become apparent to those skilled in the art from the following description and appended claims and in connection with the accompanying drawings wherein:

FIGURE 3 is a side view of an operational portion of the present invention, shown in conjunction with associated railway car parts;

FIGURE 4 is an end view of the structure shown in FIGURE 3, from the right of that figure; and FIGURE 5 is a schematic view showing the condition of the roll stabilizer as the car body rocks to the right;

Figure 1:
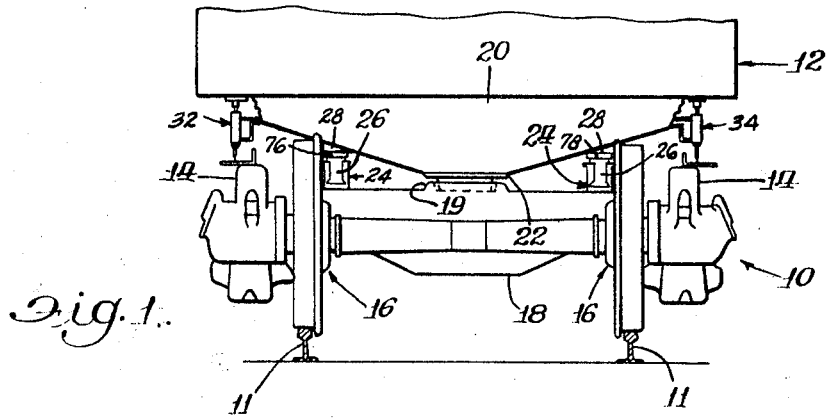
FIGURE 1 is an end view, with certain parts removed, of a railway vehicle.

It will be understood that certain details have been omitted from some views for the sake of clarity or in instances where those details are better illustrated in other views.

The car body roll herein referred to may be best illustrated by reference to FIGURE 1, which shows a railway car truck 10 supporting a car body 12. It will be understood that the entire car body 12 is supported by at least two car trucks substantially identical to that shown at 10. Each car truck 10 comprises a pair of spaced side frames 14 supported upon wheel and axle assemblies 16, the wheels of which assemblies travel on rails 11. A truck bolster 18 having a female centerplate 19 extends between side frames 14 and is resiliently supported near its ends on spring groups (not shown) within the side frames. The car body 12 is supported on a car bolster 20 including a male centerplate 22 that rests upon the female centerplate 19 of the truck bolster 18. Side bearings 24 having pads or rollers 26 are mounted adjacent opposite ends of the truck bolster 18 and are engageable with corresponding bearing surfaces 28 on the car bolster 20.

During normal operation of the vehicle shown, substantially all of the weight of the car body 12 acts upon the truck bolster 18 through the centerplates 22 and 19. The side bearings 24 serve to stabilize the car during negotiation of curves, but ordinarily provide no direct support for the car body.

As the wheels 16 roll along the rails 11, elevations or depressions in each rail, such as those caused by staggered rail joints, may cause the car body 12 to rock from side to side on its centerplate 22 relative to the car truck 10. This condition is amplified at certain speeds if the wheels 16 pass over rail irregularities at appropriate times in the roll cycle, and the side bearings 26 and 28 may engage with considerable force. The present invention contemplates the provision of suitable means to oppose those forces generated by such motion of the car body relative to the car truck. More specifically, the present invention contemplates the provision of non-resilient wedges urgable between the rollers 26 of the truck bolster side bearings 24 and the corresponding side bearing surfaces 28 of the body bolster 20, said wedges being hydraulically actuated by sensing means between the car body 12 and the truck side frames 14.

Figure 2:
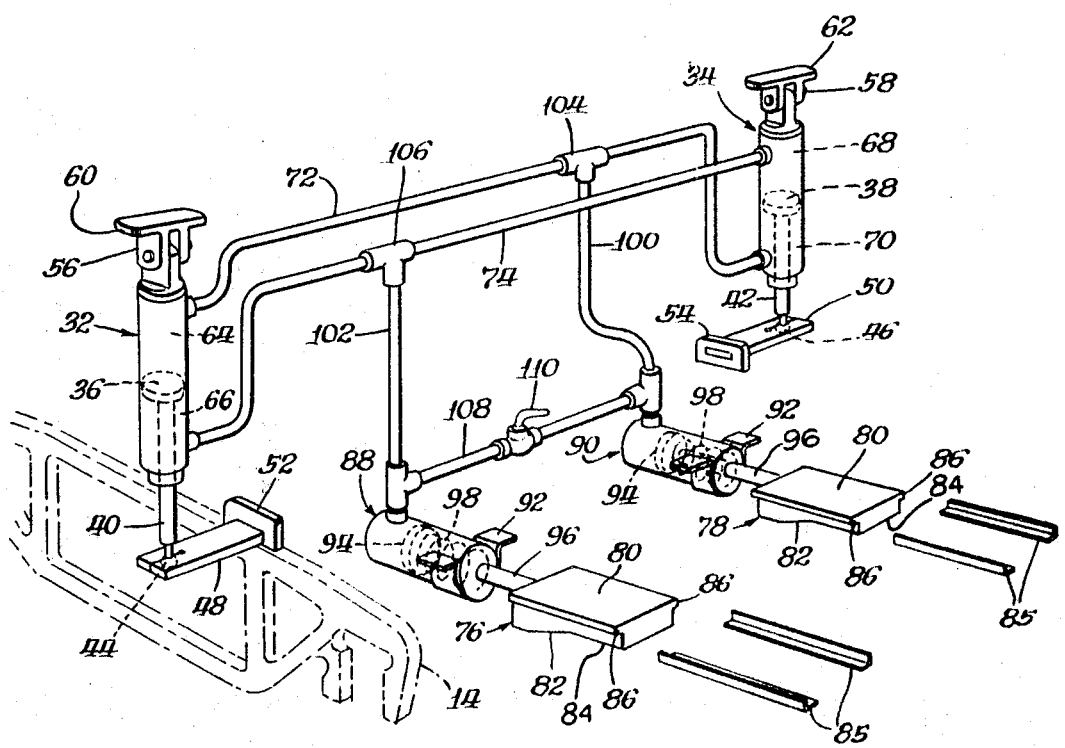
FIGURE 2 is a perspective view of a complete assembly of the presently described invention, shown dissociated from the railway vehicle.

A preferred embodiment of the invention is illustrated in FIGURE 2, said embodiment being adapted for mounting on the railway vehicle shown in FIGURE 1. Push-pull or double acting hydraulic sensing cylinders 32 and 34 are connected between respective left and right side frames 14 of the car truck 10 and corresponding portions of the car body 12. Cylinders 32 and 34 carry respective pistons 36 and 38 secured to downwardly-extending piston rods 40 and 42, said rods being in turn connected by means of respective ball joints 44 and 46 to cantilever springs or surge absorbers 48 and 50. Surge absorbers 48 and 50 are substantially horizontally disposed and extend outwardly from their securement at 52 and 54, respectively, to a corresponding compression member of the side frames and serve to protect the hydraulic cylinders against sudden shocks. The upper end of cylinders 32 and 34 are connected by means of pivotal joints 56 and 58 to brackets 60 and 62 secured to corresponding portions of the car body. Pivotal joints 56 and 58 and ball joints 44 and 46 allow swiveling of the car trucks in a horizontal plane relative to the car body, which primarily occurs when the vehicle is negotiating a curve. Otherwise, a positive vertical connection is provided between the car body and the side frames, said connection being responsive to relative rocking movement between the car body and the car truck.

As shown in FIGURE 2, the piston 36 within the left sensing cylinder 32 defines upper and lower chambers 64 and 66, respectively. Similarly, piston 38 within right sensing cylinder 34 defines upper and lower chambers 68 and 70, respectively. Hydraulic lines or flexible hoses 72 and 74 are cross-connected between respective upper chambers 64 and 68, and opposite lower chambers 70 and 66, respectively.

Means are provided in conjunction with the sensing cylinders 32 and 34 to automatically and selectively decrease the effective distance between the side bearings 24 and 28 on either side of the vehicle during lateral rocking movements of the car body 12 relative to the car truck 10. As best shown in FIGURES 2, 3 and 4, wedges 76 and 78 are provided between the side bearings 24 and 28 on both sides of the vehicle, said wedges each comprising a horizontal top wall element 80 and an inwardly inclined bottom wall 82 merging with a bottom wall 84 coplanar with said top wall. As shown in FIGURES 2 and 3, the bolster side bearing 24 includes a base 25 within which a pad or roller 26 is disposed. The car body side bearing 28 has been reduced in thickness to accommodate the wedges 76 and 78. The wedges 76 and 78 are slidably held above the pads or rollers 26 of the truck side bearings 28 by means of two opposed L-shaped brackets 85 secured to each body side bearing 28. Wing extensions 86 are provided on both sides of each wedge 76 and 78 and slidably engage the L-shaped brackets 84.

Means are provided in conjunction with the sensing cylinders 32 and 34 for extending wedges 76 and 78 longitudinally outwardly of the truck between the side bearings 26 and 28. Single acting wedge cylinders 88 and 90 are secured by means of brackets 92 to the car body, and each includes a piston 94 connected to a piston rod 96, and a helical return spring 98 that tends to return the piston 94 back to a normal position after being extended. The piston rod 96 extends outwardly from the wedge cylinders 88 and 90 and is connected to respective wedges 76 and 78.

Two branch lines 100 and 102 are connected by means of respective T's 104 and 106 from respective lines 72 and 74 to the inlet chambers of the single acting wedge cylinders 88 and 90, such that the upper chamber of each sensing cylinder on one side of the vehicle is directly connected to a wedge cylinder on the other side of the vehicle. A connecting line 108 is provided between the branch lines 100 and 102 and is interdicted by a preset regulating valve 110 of known construction. The connecting line 108 and its associated regulating valve 110 function to re-establish equilibrium of the entire system for a long duration leaning condition of the car body, such as that created by super-elevated curves or an off-center load in the car. All of the hydraulic lines described herein are preferably flexible and may be secured to the truck or to the car in any desired manner.

It may now be seen that the wedge cylinders 88 and 90 cause the wedges 76 and 78 to be extended and retracted as the sensing cylinders 32 and 34 are actuated by the rocking of the car body relative to the side frames. As the car body returns to a stable horizontal position, the springs 98 within the wedge cylinders 88 and 90 tend to return the wedges 76 and 78 to a normal unretracted position. The thickness and length of the extension defined by top wall 80 and coplanar bottom wall 84 of each wedge 76 and 78 is such to establish standard side bearing clearance with both side wedges in retracted position.

The operation of the present invention may be best understood by reference to FIGURES 1 and 5. As the wheels 16 on the left side of the truck 10 encounter a slight rise or bump in the rails, the wheels and associated side frame 14 will be forced upward, causing the car body 12 to rock on its centerplate 22 to the right. At the same time, the left sensing cylinder piston rod 40 and piston 36 will be forced upwardly into the left sensing cylinder 32 from their equalized position, represented by a dashed line, to a new position, shown by a solid line.

The movement of piston 36 forces fluid out of the upper chamber 64 and draws fluid in at the bottom chamber 66, as shown by the fluid flow arrows. At the same time, the right side piston 38 and piston rod 42 are extended downwardly relative to right cylinder 34, thereby drawing fluid into the upper chamber 68 and forcing the fluid out of the lower chamber 70, due to the movement of the right side frame from the position shown by dashed lines to the position shown by full lines. The simultaneous but opposite action of left and right pistons 36 and 38 respectively causes hydraulic fluid to be forced from both cylinders 32 and 34 toward the T 104, and hence through branch line 100, thereby causing the piston 94 and piston rod 96 to move outwardly and extend the wedge 78. At the same time, hydraulic fluid is withdrawn from cylinder 88 causing the wedge 76 to retract. Of course, any compression or extension of one of the pistons 36 or 38 relative to the other will actuate the wedges 76 and 78.

Thus, the inwardly inclined surface 82 of the right side wedge 78 will be urged into the gap between the car body side bearing 28 and the bolster side bearing 26 (FIGURE 3) to provide temporary support against rocking motions of the car body relative to the truck bolster. The left side wedge 76 will retract normally by the transfer of fluid within the system and by the energy of the compressed return spring 98 in the left side wedge cylinder 88. Such action of the sensing cylinders 32 and 34 in conjunction with the wedge cylinders 88 and 90 and their respective wedges 76 and 78 will allow both sides of the truck to follow rail irregularities without allowing the car body to begin rocking on its center plate relative to the truck bolster. The rocking velocity of the car body is substantially decreased because of the decreased distance within which rocking may occur, and hence the forces generated by such relative rocking motions are decreased. It should be noted that during such sudden rocking motions, the hydraulic fluid pressure in the system will not be equalized through regulating valve 110 on line 108, since this valve permits only gradual fluid flow therethrough.

Figure 6:
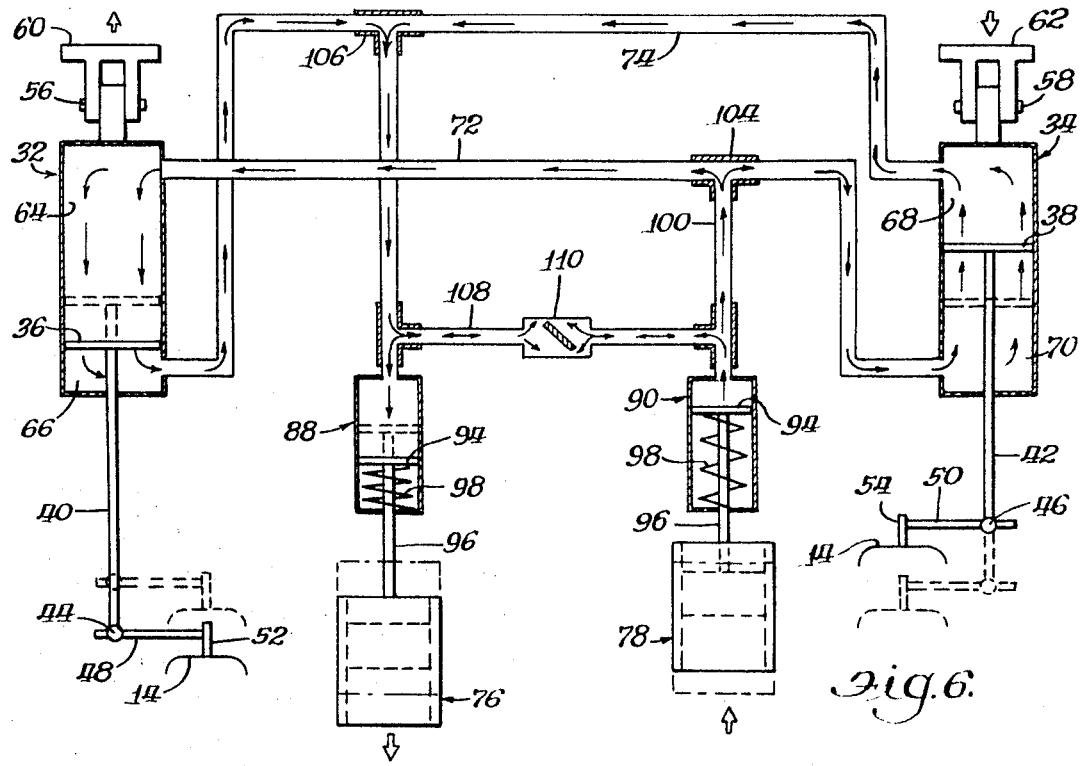
FIGURE 6 is a schematic view with the car undergoing a long duration roll to the left.

While the present invention inhibits car body roll relative to the car truck, other normal operations and movements of the vehicle are not impaired. For example, FIGURE 6 diagrammatically shows the flow pattern of hydraulic fluid when the car body undergoes a roll of long term duration, such as may be encountered when the car is negotiating a curve or when the load in the car is off center.

As the car body undergoes a roll to the right of relatively long duration, the action of sensing cylinders allows gradual retraction of the right wedge 78 and causes extension of the left wedge 76 until an equilibrium is reached between wedge cylinders 88 and 90 due to the gradual passage of hydraulic fluid through the regulating valve 110. Thus, in this instance, the movement of wedges 76 and 78 will be sufficient to maintain proper side bearing clearance between the truck and body side bearings until the car body returns to normal position.

Figure 7:
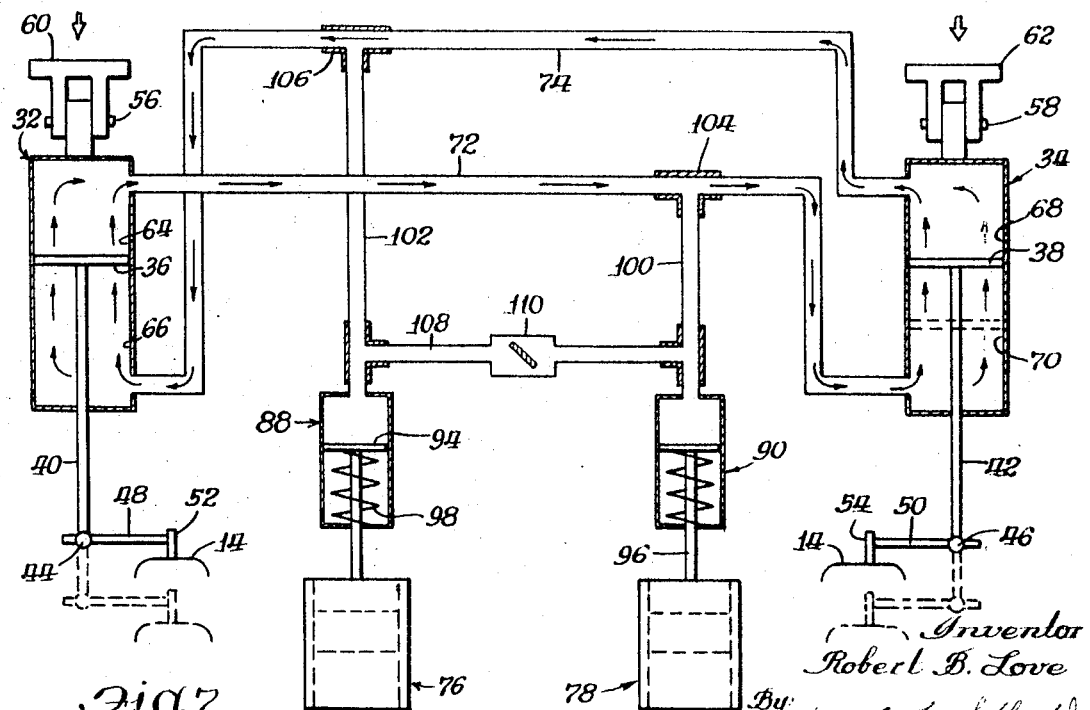
FIGURE 7 is a schematic view showing conjoint movement of the car body relative to the truck, with no rocking of the car body.

Also, the present invention remains substantially inoperative during conjoint movements of the car body relative to the car truck, as diagrammatically shown in FIGURE 7. This condition is normally caused by the bouncing or the loading of the car body. In this instance, there is no resultant movement of the wedges 76 and 78, since equal amounts of fluid are displaced from both sensing cylinders 32 and 34.

From the foregoing description, it may be seen that two interdependent hydraulic systems are provided and are interconnected by a regulating valve 110 on line 108. The first system comprises upper chamber 64 of sensing cylinder 32 and lower chamber 70 of sensing cylinder 34 interconnected by line 72, said cylinders being so arranged to force hydraulic fluid through a branch line 100 toward a wedge actuating cylinder 90 located on the same side of the vehicle toward which the car body is rocking relative to the car truck. The other system is conversely arranged, such that a wedge cylinder 88 is actuated on the other side of the vehicle during rocking movements in the other direction. During short duration rocking movements of the car body relative to the car truck, the two systems act substantially separately in actuating the wedges 76 and 78. However, during gradual or rolling motions of longer duration, the regulating valve 110 tends to balance the systems while maintaining proper side bearing clearance during the roll.

I claim:

1. In conjunction with a railway vehicle having a car body including a car bolster supported upon the bolster of a truck by means of engaging centerplates, wherein said truck bolster is resiliently supported between spaced side frames mounted upon wheel and axle assemblies, a roll stabilizing arrangement comprising restraining means at both sides of the vehicle between adjacent parts of said truck bolster and said car body bolster, and hydraulic means connected between said car body and said side frames on both sides of said vehicle responsive to lateral rocking motions therebetween, said last-mentioned means being hydraulically connected to said restraining means and operative to actuate said restraining means on that side of the vehicle on which the distance between the car body and car truck is decreasing relative to the other side of said vehicle.

2. In conjunction with a railway vehicle having a car body supported upon at least two car trucks, each of said car trucks including spaced side frames resiliently interconnected by a bolster, and side bearings at both sides of said truck bolster engageable with corresponding bearing surfaces on the overlying car body, a roll stabilizer comprising wedge means extendable between each of the bolster side bearings and the corresponding bearing surfaces of the overlying car body, and hydraulic means for urging said wedge means therebetween during rocking motions of the car body relative to the truck bolster, said hydraulic means comprising hydraulic cylinders connected to said wedge means and means connected between said car body and each of said side frames for causing hydraulic fluid to flow into and out of said cylinders, whereby said wedge means are extended and retracted, said last-mentioned means being so connected to said hydraulic cylinders as to extend said wedge means on the side of the vehicle at which the distance between the car body and a side frame is decreasing during such relative rocking motions.

3. The invention according to claim 2 wherein said hydraulic cylinders are interconnected by regulating valve means for permitting gradual fluid flow therethrough between said cylinders.

4. In conjunction with a railway vehicle having a car body including a car bolster supported upon a truck bolster by means of engaging centerplates, wherein said truck bolster is resiliently interconnected between spaced side frames supported upon wheel and axle assemblies, and wherein corresponding engageable side bearing surfaces are located on said truck and car bolsters proximate the ends thereof, a roll stabilizer comprising hydraulic means connected between respective side frames and corresponding portions of said car body, said hydraulic means each comprising a cylinder connected to the car body and a piston within said cylinder connected to the side frame, said piston defining two chambers in said cylinder, hydraulic lines cross-connecting the chambers of said hydraulic cylinders on opposite sides of said vehicle, wedge means urgable between the side bearing surfaces of said truck bolster and said car body at both sides thereof, and second hydraulic means for urging each of said wedge means, said second hydraulic means connected to respective hydraulic lines such that compression of said piston in said first hydraulic means on one side of said vehicle causes extension of said wedge means at the opposite side thereof.

5. The invention according to claim 4 wherein regulating valve means is provided between said second hydraulic means for gradually equalizing pressures therebetween.

6. The invention according to claim 5 wherein said wedge means includes a horizontal top surface and an inwardly inclined bottom surface merging with a bottom surface substantially coplanar with said top surface, said coplanar surfaces forming an extension between said side bearing surfaces when said wedge means is in a retracted position.

7. The invention according to claim 6 wherein said wedge means is slidably mounted in said car body above said bolster side bearing surfaces and wherein said extension provides normal side bearing clearance when said wedge means are in a retracted position.

8. In conjunction with a railway vehicle having a car body including a car bolster supported upon a truck bolster by means of engaging centerplates, wherein said truck bolster is resiliently interconnected between spaced side frames supported upon wheel and axle assemblies, and wherein corresponding engageable side bearing surfaces are located on said truck and car bolsters proximate the ends thereof, a roll stabilizer comprising hydraulic means connected between each side frame of the car trucks and corresponding portions of the car body, said hydraulic means each comprising a cylinder pivotally connected to the car body and a piston within said cylinder connected to the side frame, said piston defining two chambers in said cylinder, hydraulic lines cross-connecting the chambers of said hydraulic cylinders on opposite sides of each truck, wedge means slidably connected to said car body over each side bearing surface of each truck bolster, second hydraulic means for extending and retracting each wedge means between said car body and said bolster side bearings, a branch line connected between each of said hydraulic lines and said second hydraulic means such that compression of a piston on one side of said truck will cause extension of a wedge means on the other side thereof, and regulating valve means between said branch lines.

9. The invention according to claim 8 wherein the connection between each side frame and a corresponding piston comprises a piston rod connected to said piston and extending from said cylinder, a cantilever spring extending from said side frame, and a ball joint connecting said piston rod to said cantilever spring.

10. The invention according to claim 8 wherein said wedge means comprises a top wall, an inwardly inclined bottom wall merging with a wall coplanar with said top wall and forming an extension therewith; and wherein said extension provides normal side bearing clearance when said wedge means are in a retracted position.

References Cited

UNITED STATES PATENTS

| 1,735,492 | 11/1929 | Blunt | 105—200 XR |
| 2,093,486 | 9/1937 | Schoepf et al. | 105—199 |
| 2,474,471 | 6/1949 | Dolan II | 105—199 XR |

ARTHUR L. LA POINT, Primary Examiner

HOWARD BELTRAN, Assistant Examiner

U.S. Cl. X.R.

105—200; 308—138